United States Patent
Zou et al.

(10) Patent No.: US 12,269,836 B2
(45) Date of Patent: Apr. 8, 2025

(54) BETA-PHOSPHONYL-ENAMINE DERIVATIVE AND PREPARATION METHOD THEREFOR

(71) Applicant: SOOCHOW UNIVERSITY, Suzhou (CN)

(72) Inventors: Jianping Zou, Suzhou (CN); Dongliang Zhang, Suzhou (CN); Chengkun Li, Suzhou (CN); Guoyu Zhang, Suzhou (CN); Zekun Tao, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 1121 days.

(21) Appl. No.: 17/146,466

(22) Filed: Jan. 11, 2021

(65) Prior Publication Data
US 2021/0130377 A1 May 6, 2021

Related U.S. Application Data

(63) Continuation of application No. PCT/CN2018/095520, filed on Jul. 12, 2018.

(51) Int. Cl.
 *C07F 9/50* (2006.01)
 *B01J 23/44* (2006.01)
(52) U.S. Cl.
 CPC ............ *C07F 9/5063* (2013.01); *B01J 23/44* (2013.01)
(58) Field of Classification Search
 CPC ...... C07F 9/5063; C07F 9/142; C07F 9/4006; C07F 9/4015
 USPC ............................................................ 568/15
 See application file for complete search history.

(56) References Cited

FOREIGN PATENT DOCUMENTS

| CN | 101343289 A | | 1/2009 |
| CN | 108864185 A | * | 11/2018 |
| EP | 0107907 A2 | | 5/1984 |

OTHER PUBLICATIONS

Machine translation CN 108864185A, 2018.*
B.C. Bpobapeu "Perspective approach to the synthesis of beta-phosphorylated enamides" Zhurnyl Obshchei Khimii, vol. 67, No. 10, pp. 1755-1756 (Dec. 31, 1997).
Krawczyk et al., "Synthesis and crystal structure of 1-(aminomethyl)vinylphosphonic acid" Tetrahedron 64 (2008) 5051-5054 (Mar. 22, 2008).

* cited by examiner

*Primary Examiner* — Ana Z Muresan
(74) *Attorney, Agent, or Firm* — SZDC Law PC

(57) ABSTRACT

The present invention discloses the preparation method of β-phosphonyl-enamine derivative. The preparation method comprising the following steps: dissolving the enamine derivative, organic phosphine compound, manganese acetate and potassium carbonate in the solvent, reacting at room temperature to obtain the β-phosphonyl-enamine derivative. The enamine derivative was as the starting material, and the raw materials are easy to obtain and a great many varieties. The various forms of the products obtained therein can be directly applied and can be used in further reactions. The reaction conditions are mild, the reaction speed is high, the reaction operation and the post-treatment process are simple, the production is convenient, and the method is suitable for large-scale production.

6 Claims, No Drawings

BETA-PHOSPHONYL-ENAMINE DERIVATIVE AND PREPARATION METHOD THEREFOR

This application is the Continuation Application of PCT/CN2018/095520, filed on Jul. 12, 2018, which is incorporated by reference for all purposes as if fully set forth herein.

TECHNICAL FIELD

The invention belongs to the technical field of the preparation of organic compounds, and particularly relates to a method for preparing a β-phosphonoenamine derivative.

BACKGROUND TECHNIQUE

β-phosphonoenamine is an important class of compounds that can be easily converted to β-aminophosphonic acid, which has a wide range of physiological activities, such as antibacterial, nerve stimulation, affecting cell growth and metabolism, analgesia, and regulating blood pressure and regulate plant growth. It can be used as anticancer drugs, antibiotics, herbicides, fungicides, antagonists, anthocyanin synthesis inhibitors, fructose diphosphatase inhibitors, etc. (see 1. Maier, L. Phosphorus Sulfur 1983, 14, 295; 2. Ann H. Hunt, Thomas K. Elzey, J. Antibiot. 1988, 41, 802; 3. Stephen, H.; Youssef, L B; Yolande, H. Synlett 1993, 1, 35-36). In the prior art, the synthesis methods of β-phosphonoenamine derivatives are mainly as follows:

1. The β-phosphonoenamine derivative is prepared from the condensation reaction of α-phosphonoacetonitrile and imine ether. This method requires a reaction at a high temperature, and raw materials are difficult to obtain;
2. The β-phosphonoenamine derivative is prepared by reacting a phosphonoacrylate with an amine, and the raw materials used in this method are difficult to obtain;
3. The β-phosphonoenamine derivative is prepared by reacting an alkylphosphonate with a fluoroalkylnitrile. This method requires equivalent metal lithium reagents, harsh reaction conditions, and difficult to obtain raw materials.
4. A β-phosphonoenamine derivative is prepared by reacting a vinyl phosphonate with an amine. This method requires the use of a noble metal rhodium as a catalyst and carbon monoxide and hydrogen.

In summary, it is very important to develop a method for preparing β-phosphonoenamine derivatives that is easy to obtain starting materials, has mild reaction conditions, has a wide range of applications, high yields, low costs, and meets the requirements of green chemistry.

Technical Problem

The object of the present invention is to provide a β-phosphonoenamine derivative and a preparation method thereof.

Technical Solutions

In order to achieve the above-mentioned object of the invention, the technical solution adopted by the present invention is:

A method for preparing a β-phosphonoenamine derivative which comprises the following steps: dissolving an enamine derivative, an organic phosphine compound, manganese acetate, and potassium carbonate in a solvent and reacting at room temperature to obtain the β-phosphonoenamine derivative;

The structural formula of enamine derivative is shown as follow:

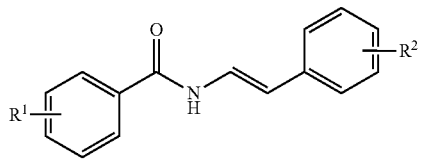

The selection of $R^1$ and $R^2$ is one of the followings:
(1) $R^1$ is hydrogen, methyl, methoxy, fluorine, chlorine, bromine, or trifluoromethyl, and $R^2$ is hydrogen;
(2) $R^2$ is methyl, methoxy, fluorine, chlorine, or bromine, and $R^1$ is hydrogen;

The structural formula of organic phosphine compound is shown as follow:

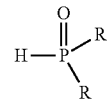

R is methoxy, ethoxy, isopropoxy, tert-butoxy, or phenyl; the solvent is methanol, ethanol, acetonitrile, acetone, or acetic acid.

The structural formula of β-phosphonyl-enamine derivative is shown as follow:

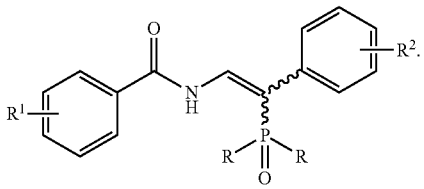

In the technical solution above, the enamine derivative is selected from the group consisting of N-(styryl)benzamide, 2-chloro-N-(styryl)benzamide, 2-fluoro-N-(styryl)-benzamide, 3-bromo-N-(styryl)benzamide, 4-bromo-N-(styryl)benzamide, 4-methyl-N-(styryl)benzamide, 4-methoxy-N-(styryl)benzamide, 4-trifluoromethyl-N-(styryl)-benzamide, 3,4,5-trimethoxy-N-(styryl)benzamide, N-(styryl)-thienylamide, N-(2-methyl styryl)benzamide, N-(2-methoxystyryl)benzamide, N-(2-fluorostyryl)benzamide, N-(2-chlorostyryl)-benzamide, N-(3-methyl Styryl)benzamide, N-(3-chlorostyryl)benzamide, N-(4-methyl styryl)-benzamide, N-(4-methoxystyryl)benzene formamide, N-(4-fluorostyryl)-benzamide, N-(4-chlorostyryl)-benzamide, and N-(4-bromostyryl)-benzamide.

In the technical solution above, the molar ratio of the enamine derivative, the organic phosphine compound, the manganese acetate, the potassium carbonate is 1:2:2.5:2.

The present invention also discloses the application of the preparation of β-phosphonoenamine derivatives with the substrates are enamine derivatives and organic phosphine compounds; the structural formula of enamine derivative is as follow:

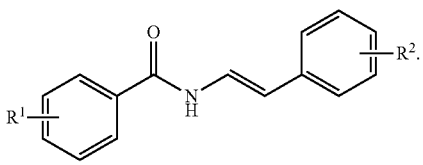

The selection of $R^1$ and $R^2$ is one of the followings:
(1) $R^1$ is hydrogen, methyl, methoxy, fluorine, chlorine, bromine, or trifluoromethyl, and $R^2$ is hydrogen;
(2) $R^2$ is methyl, methoxy, fluorine, chlorine, or bromine, and $R^1$ is hydrogen;

The structural formula of organic phosphine compound is shown as follow:

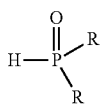

R is methoxy, ethoxy, isopropoxy, tert-butoxy, or phenyl.

Preferably, the preparation is carried out in the presence of manganese acetate and potassium carbonate at room temperature in the solvent.

The reaction process of the above technical solution can be expressed as:

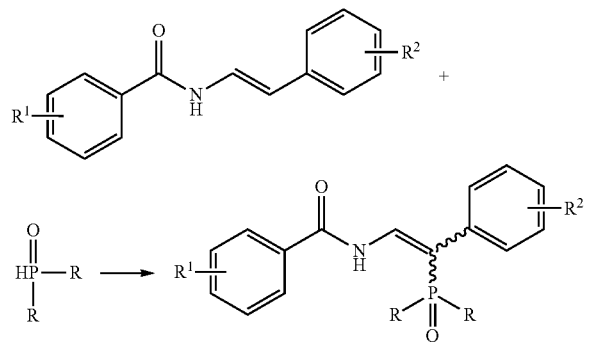

The present invention also discloses a method for preparing compound A that includes the following steps:
(1) Compound A1, dimethyl phosphite, manganese acetate, and potassium carbonate are dissolved in a solvent and reacted at room temperature to obtain compound A2;
(2) Compound A2 is reduced by hydrogen in the presence of a Pd/C catalyst to obtain compound A3;
(3) Compound A3, paraformaldehyde, and diethylamine are reacted under the inert atmosphere to obtain compound A4;
(4) Compound A4 is reacted with concentrated hydrochloric acid to obtain compound A.

In the technical solution above, the molar ratio of compound A1, dimethyl phosphite, manganese acetate, and potassium carbonate is 1:2:2.5:2; The molar amount of the catalyst Pd/C is 10% of molar amount of the compound A2; the molar ratio of compound A3, paraformaldehyde and diethylamine is 1:5:1. Concentrated hydrochloric acid is the conventional reagent, which is as both acid and the solvent.

In the technical solution above, the inert atmosphere is the argon atmosphere.

Specifically, the preparation method of compound A is as follows:

With enamine (A1) and dimethyl phosphite as raw materials, the reaction steps are as follows:
(1) Mixing enamine A1 (213 mg, 1 mmol), dimethyl phosphite (220 mg, 2 mmol), manganese acetate (580 mg, 2.5 mmol), anhydrous potassium carbonate (276 mg, 2 mmol) and 10 mL of methanol in in the reaction flask. The mixture was stirred at room temperature for reaction;
(2) TLC followed the whole reaction to completion (for about 0.5 hours);
(3) After the reaction, the crude product was separated by silica gel column chromatography to obtain the target product A2;
(4) Mixing A2 (321 mg, 1 mmol) and tetrahydrofuran (12 mL) in the reaction flask, and then adding catalyst Pd/C (32.1 mg, 10 mol %). The mixture was reacted at room temperature under the hydrogen (1 atmosphere) atmosphere for 6 hours. After the reaction, the crude product was separated by silica gel column chromatography to obtain the target product A3;
(5) Mixing A3 (323 mg, 1 mmol), paraformaldehyde (150 mg, 5 mmol) diethylamine (80 mg, 1 mmol) and anhydrous methanol (1 mL) in the reaction flask. The mixture was refluxed for 24 h under the protection of argon. After the reaction, the solvent was removed in vacuo, and then toluene was added for distillation to remove methanol. P-toluenesulfonic acid (1.5 mg, 0.01 mmol), anhydrous toluene (5 mL) and 4 Å molecular sieves were added, and the mixture was refluxed under argon for 24 h. After the reaction, the crude product was separated by silica gel column chromatography to obtain the target product A4;
(6) Mixing A4 (335 mg, 1 mmol) and concentrated hydrochloric acid (20 mL) in the reaction flask. Heating it and refluxing until to the end of the reaction. Adding 50 ml of water, extracting with dichloromethane, concentrating, and drying. The crude product was recrystallization of ethanol/water to obtain the target, product A.

The chemical structural formulas and reactions of the above substances are shown below:

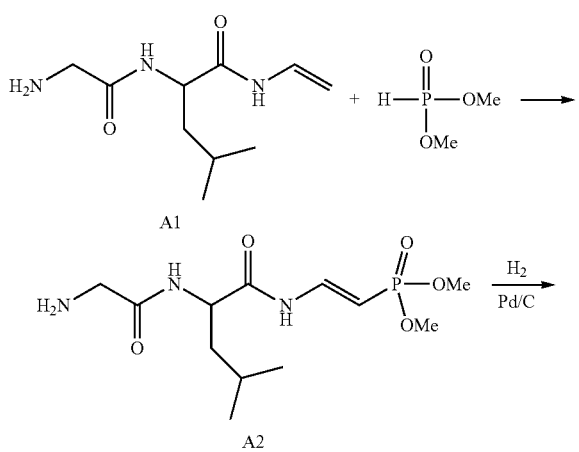

-continued

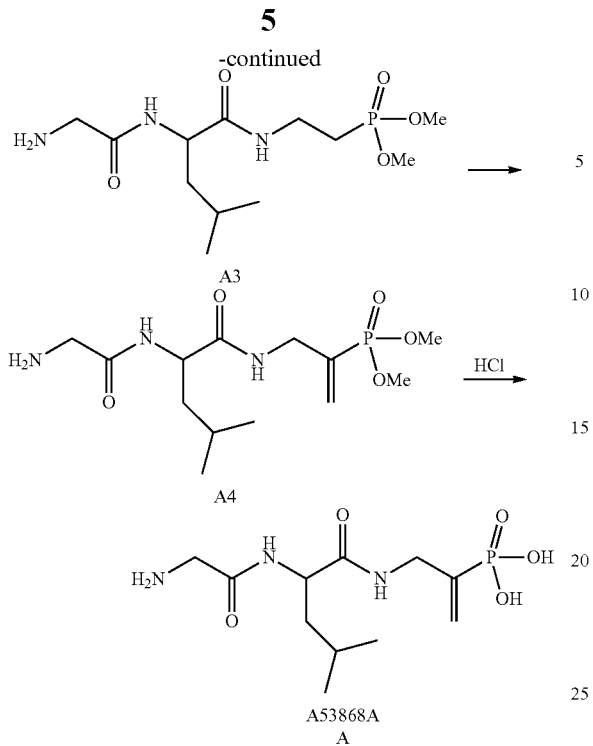

The prepared compound A is an existing antibiotic.

Beneficial Effect

Due to the application of the above technical solutions, the present invention has the following advantages over the prior art:

1. The present invention uses an enamine derivative as a starting material, and the raw materials are easily available and there are many types; the products obtained by the method of the present invention are of various types, and can be used directly or used for other further reactions.

2. The invention has mild reaction conditions, fast reaction speed, simple reaction operation and post-treatment process, high yield, and is suitable for large-scale production.

EMBODIMENTS OF THE INVENTION

Example 17 Synthesis of N-(2-(diphenylphosphine)-2-(2-chlorophenyl) vinyl) benzamide Taking N-(2-chlorostyryl) benzamide as the raw material, the reaction steps are as follows:
(1) Mixing N-(2-chlorostyryl) benzamide (257 mg, 1 mmol), diphenylphosphine (404 mg, 2 mmol), manganese acetate (580 mg, 2.5 mmol), anhydrous potassium carbonate (276 mg, 2 mmol) and 10 mL of methanol in the reaction bottle. The mixture was stirred at room temperature for reaction;
(2) TLC followed the whole reaction to completion (for about 0.5 hours);
(3) After the reaction the crude product was separated by column chromatography (dichloromethane:methanol=100:1) to obtain the target product (yield 82%). The analytical data of the products are as follows: $^1$H NMR (400 MHz, CDCl$_3$): δ8.20 (d, J=11.0 Hz, 1H), 8.13-8.06 (m, 2H), 7.99 (dd, J=30.7, 10.6 Hz, 1H), 7.62-7.46 (m, 9H), 7.40 (td, J=7.7, 3.0 Hz, 4H), 7.22 (d, J=7.8 Hz, 1H), 7.14 (t, J=7.7 Hz, 1H), 7.01 (t, J=7.5 Hz, 1H), 6.88 (d, J=7.7 Hz, 1H).

Example 18 Synthesis of N-(2-(diphenylphosphine)-2-(3-methylphenyl)vinyl)benzamide Taking N-(3-methylstyryl) benzamide as the raw material, the reaction steps are as follows:
(1) Mixing N-(2-chlorostyryl)benzamide (237 mg, 1 mmol), diphenylphosphine (404 mg, 2 mmol), manganese acetate (580 mg, 2.5 mmol), anhydrous potassium carbonate (276 mg, 2 mmol) and 10 mL of methanol in the reaction bottle. The mixture was stirred at room temperature for reaction;
(2) TLC followed the whole reaction to completion (for about 0.5 hours);
(3) After the reaction the crude product was separated by column chromatography (dichloromethane:methanol=100:1) to obtain the target product (yield 90%). The analytical data of the products are as follows: $^1$H NMR (400 MHz, CDCl$_3$): δ 8.12 (d, J=8.3 Hz, 1H), 7.78 (s, 4H), 7.58-7.48 (m, 6H), 7.45 (s, 4H), 7.41-7.36 (m, 2H), 7.24 (s, 1H), 7.12 (d, J=17.2 Hz, 2H), 2.28 (s, 3H).

Example 19 Synthesis of N-(2-(diphenylphosphine)-2-(3-chlorophenyl)vinyl)benzamide Taking N-(3-chlorostyryl)benzamide as the raw material, the reaction steps are as follows:
(1) Mixing N-(3-chlorostyryl) benzamide (257 mg, 1 mmol), diphenylphosphine (404 mg, 2 mmol), manganese acetate (580 mg, 2.5 mmol), anhydrous potassium carbonate (276 mg, 2 mmol) and 10 mL of methanol in the reaction bottle. The mixture was stirred at room temperature for reaction;
(2) TLC followed the whole reaction to completion (for about 0.5 hours);
(3) After the reaction the crude product was separated by column chromatography (dichloromethane:methanol=100:1) to obtain the target product (yield 88%). The analytical data of the products are as follows: $^1$H NMR (400 MHz, CDCl$_3$): δ8.03 (d, J=11.6 Hz, 1H), 7.77 (dd, J=11.6, 7.5 Hz, 4H), 7.65-7.45 (m, 6H), 7.48 (dd, J=9.7, 4.4 Hz, 4H), 7.42 (t, J=7.6 Hz, 2H), 7.37-7.29 (m, 3H), 7.24 (d, J=6.4 Hz, 1H).

Example 20 Synthesis of N-(2-(diphenylphosphine)-2-(4-methylphenyl)vinyl)benzamide Taking N-(4-methylstyryl)benzamide as the raw material, the reaction steps are as follows:
(1) Mixing N-(4-methylstyryl) benzamide (237 mg, 1 mmol), diphenylphosphine (404 mg, 2 mmol), manganese acetate (580 mg, 2.5 mmol), anhydrous potassium carbonate (276 mg, 2 mmol) and 10 mL of methanol in the reaction bottle. The mixture was stirred at room temperature for reaction;
(2) TLC followed the whole reaction to completion (for about 0.5 hours);
(3) After the reaction the crude product was separated by column chromatography (dichloromethane:methanol=100:1) to obtain the target product (yield 84%). The analytical data of the products are as follows: $^1$H NMR (400 MHz, CDCl$_3$): δ8.14 (d, J=11.3 Hz, 1H), 7.76 (dd, J=11.5, 7.7 Hz, 4H), 7.68-7.62 (m, 1H), 7.57

(d, J=7.6 Hz, 2H), 7.53-7.48 (m, 3H), 7.47-7.42 (m, 4H), 7.39 (t, J=7.6 Hz, 2H), 7.18 (dd, J=20.4, 7.8 Hz, 4H), 2.31 (s, 3H).

Example 21 Synthesis of N-(2-(diphenylphosphine)-2-(4-methoxyphenyl)vinyl)benzamide Taking N-(4-methoxystyryl) benzamide as the raw material, the reaction steps are as follows:
(1) Mixing N-(4-methoxystyryl)benzamide (253 mg, 1 mmol), diphenylphosphine (404 mg, 2 mmol), manganese acetate (580 mg, 2.5 mmol), anhydrous potassium carbonate (276 mg, 2 mmol) and 10 mL of methanol in the reaction bottle. The mixture was stirred at room temperature for reaction;
(2) TLC followed the whole reaction to completion (for about 0.5 hours);
(3) After the reaction the crude product was separated by column chromatography (dichloromethane:methanol=100:1) to obtain the target product (yield 83%). The analytical data of the products are as follows: $^1$H NMR (400 MHz, CDCl$_3$): δ8.10 (d, J=11.3 Hz, 1H), 7.76 (dd, J=11.6, 7.4 Hz, 4H), 7.66-7.60 (m, 1H), 7.58 (d, J=7.5 Hz, 2H), 7.51 (d, J=6.0 Hz, 3H), 7.46 (dd, J=9.8, 4.5 Hz, 4H), 7.40 (t, J=7.6 Hz, 2H), 7.25 (d, J=8.3 Hz, 1H), 6.89 (d, J=8.5 Hz, 2H), 3.78 (s, 3H).

Example 22 Synthesis of N-(2-(diphenylphosphine)-2-(4-fluorophenyl)vinyl)benzamide Taking N-(4-fluorostyryl) benzamide as the raw material, the reaction steps are as follows:
(1) Mixing N-(4-fluorostyryl) benzamide (241 mg, 1 mmol), diphenylphosphine (404 mg, 2 mmol), manganese acetate (580 mg, 2.5 mmol), anhydrous potassium carbonate (276 mg, 2 mmol) and 10 mL of methanol in the reaction bottle. The mixture was stirred at room temperature for reaction;
(2) TLC followed the whole reaction to completion (for about 0.5 hours);
(3) After the reaction the crude product was separated by column chromatography (dichloromethane:methanol=100:1) to obtain the target product (yield 84%). The analytical data of the products are as follows: $^1$H NMR (400 MHz, CDCl$_3$): δ8.01 (d, J=11.3 Hz, 1H), 7.76 (dd, J=11.9, 7.2 Hz, 4H), 7.67-7.60 (m, 1H), 7.55 (dd, J=12.1, 4.4 Hz, 4H), 7.53 (d, J=2.3 Hz, 1H), 7.47 (td, J=7.4, 2.7 Hz, 4H), 7.41 (t, J=7.7 Hz, 2H), 7.32 (dd, J=7.3, 5.5 Hz, 2H), 7.07 (t, J=8.6 Hz, 2H).

Example 23 Synthesis of N-(2-(diphenylphosphine)-2-(4-chlorophenyl)vinyl)benzamide Taking N-(4-chlorostyryl)benzamide as the raw material, the reaction steps are as follows:
(1) Mixing N-(4-chlorostyryl)benzamide (257 mg, 1 mmol), diphenylphosphine (404 mg, 2 mmol), manganese acetate (580 mg, 2.5 mmol), anhydrous potassium carbonate (276 mg, 2 mmol) and 10 mL of methanol in the reaction bottle. The mixture was stirred at room temperature for reaction;
(2) TLC followed the whole reaction to completion (for about 0.5 hours);
(3) After the reaction the crude product was separated by column chromatography (dichloromethane:methanol=100:1) to obtain the target product (yield 81%). The analytical data of the products are as follows: $^1$H NMR (400 MHz, CDCl$_3$): δ8.02 (d, J=11.5 Hz, 1H), 7.82-7.70 (m, 4H), 7.66-7.51 (m, 6H), 7.51-7.45 (m, 4H), 7.42 (t, J=7.7 Hz, 2H), 7.35 (d, J=8.5 Hz, 2H), 7.32-7.29 (m, 2H).

Example 24 Synthesis of N-(2-(diphenylphosphine)-2-(4-bromophenyl)vinyl)benzamide Taking N-(4-bromostyryl)benzamide as the raw material, the reaction steps are as follows:
(1) Mixing N-(4-bromostyryl)benzamide (301 mg, 1 mmol), diphenylphosphine (404 mg, 2 mmol), manganese acetate (580 mg, 2.5 mmol), anhydrous potassium carbonate (276 mg, 2 mmol) and 10 mL of methanol in the reaction bottle. The mixture was stirred at room temperature for reaction;
(2) TLC followed the whole reaction to completion (for about 0.5 hours);
(3) After the reaction the crude product was separated by column chromatography (dichloromethane:methanol=100:1) to obtain the target product (yield 85%). The analytical data of the products are as follows: $^1$H NMR (400 MHz, CDCl$_3$): δ8.05 (d, J=11.0 Hz, 1H), 7.76 (dd, J=11.5, 7.7 Hz, 4H), 7.60 (t, J=11.6 Hz, 3H), 7.54-7.44 (m, 9H), 7.41 (t, J=7.6 Hz, 2H), 7.24 (d, J=7.8 Hz, 2H).

Example 25 Synthesis of A53868A (A)

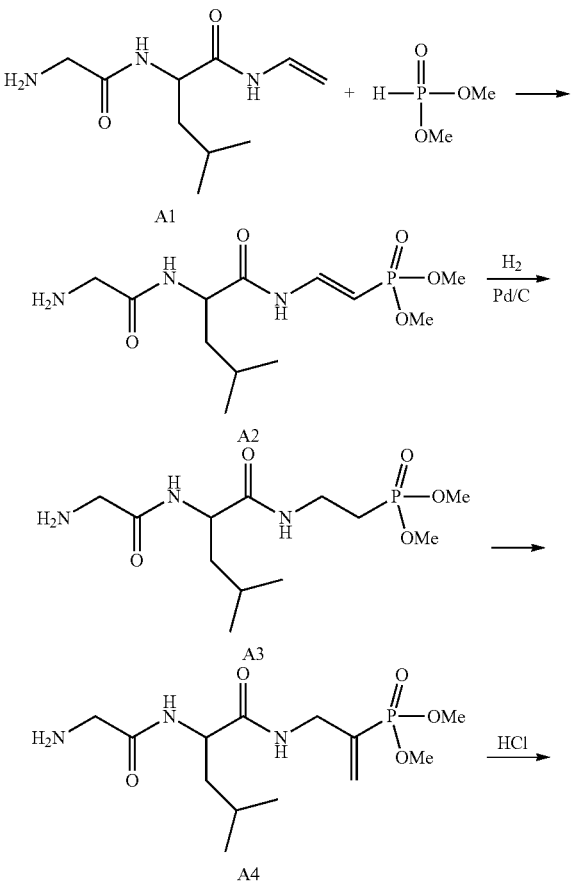

-continued

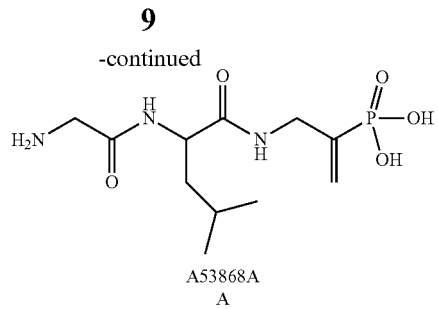

A53868A
A

With enamine (A1) and dimethyl phosphite as raw materials, the reaction steps are as follows:
(1) Mixing enamine A1 (213 mg, 1 mmol), dimethyl phosphite (220 mg, 2 mmol), manganese acetate (580 mg, 2.5 mmol), anhydrous potassium carbonate (276 mg, 2 mmol) and 10 mL of methanol in in the reaction flask. The mixture was stirred at room temperature for reaction;
(2) TLC followed the whole reaction to completion (for about 0.5 hours);
(3) After the reaction, the crude product was separated by silica gel column chromatography to obtain the target product A2 (yield 76%). The analytical data of the products are as follows: $^1$H NMR (400 MHz, CDCl$_3$): δ 9.66 (s, 1H), 7.40 (s, 1H), 7.33 (dd, J=16.9, 10.1 Hz, 1H), 5.38 (dd, J=16.8, 2.1 Hz, 1H), 5.07 (s, 2H), 4.60 (t, J=7.3 Hz, 1H), 4.41 (dd, J=10.0, 2.1 Hz, 1H), 3.54 (s, 2H), 1.86 (t, J=7.3 Hz, 1H), 1.68-1.55 (m, 2H), 0.98 (d, J=6.2 Hz, 6H);
(4) Mixing A2 (321 mg, 1 mmol) and tetrahydrofuran (12 mL) in the reaction flask, and then add catalyst Pd/C (32.1 mg, 10 mol %). The mixture was reacted at room temperature under the hydrogen (1 atmosphere) atmosphere for 6 hours. After the reaction, the crude product was separated by silica gel column chromatography to obtain the target product A3 (yield 91%). The analytical data of the products are as follows: $^1$H NMR (400 MHz, CDCl$_3$): δ8.00 (s, 1H), 7.39 (s, 1H), 5.07 (s, 2H), 4.52 (t, J=3.4 Hz, 1H), 3.67 (d, J=11.0 Hz, 6H), 3.55-3.51 (m, 3H), 3.43 (t, J=6.1 Hz, 1H), 2.09-2.00 (m, 3H), 1.74 (t, J=3.6 Hz, 2H), 1.73-1.67 (m, 1H), 0.84 (d, J=6.3 Hz, 6H);
(5) Mixing A3 (323 mg, 1 mmol), paraformaldehyde (150 mg, 5 mmol) diethylamine (80 mg, 1 mmol) and anhydrous methanol (1 mL) in the reaction flask. The mixture was refluxed for 24 h under the protection of argon. After the reaction, the solvent was removed in vacuo, and then toluene was added for distillation to remove methanol. P-toluenesulfonic acid (1.5 mg, 0.01 mmol), anhydrous toluene (5 mL) and 4 Å molecular sieves were added, and the mixture was refluxed under argon for 24 h. After the reaction, the crude product was separated by silica gel column chromatography to obtain the target product A4 (yield 83%). The analytical data of the products are as follows: $^1$H NMR (400 MHz, CDCl$_3$): δ8.77 (s, 1H), 7.16 (s, 1H), 5.11 (s, 2H), 5.07 (s, 2H), 4.59 (t, J=3.4 Hz, 1H), 3.93 (s, 2H), 3.78 (d, J=10.8 Hz, 6H), 3.54 (s, 2H), 1.88-1.83 (m, 1H), 1.67 (dd, J=4.6, 3.4 Hz, 1H), 1.57 (dd, J=4.6, 3.4 Hz, 1H), 1.00 (d, J=6.3 Hz, 6H);
(6) Mixing A4 (335 mg, 1 mmol) and concentrated hydrochloric acid (20 mL) in the reaction flask. Heating it and refluxing until to the end of the reaction. Adding 50 ml of water, extracting with dichloromethane, concentrating, and drying. The crude product was recrystallization of ethanol/water to obtain the target, product A (yield 89%). The analytical data of the products are as follows: $^1$H NMR (400 MHz, CDCl$_3$): δ8.49 (s, 1H), 7.99 (s, 1H), 5.12 (s, 2H), 5.07 (s, 2H), 4.57 (t, J=3.4 Hz, 1H), 4.16 (s, 1H), 4.05 (s, 1H), 3.54 (s, 2H), 1.93 (s, 3H), 1.89 (dd, J=7.3, 3.3 Hz, 1H), 1.61 (dd, J=7.3, 3.5 Hz, 1H), 1.45-1.32 (m, 1H), 0.87 (d, J=6.4 Hz).

Example 26 Synthesis of (2-benzamido-1-phenethyl)dimethylphosphonate (1) Taking (2-benzamido-1-styryl)dimethylphosphonate as the raw material, the reaction steps are as follows:
(2) Adding (2-benzamido-1-styryl)dimethylphosphonate (3.3 g, 10 mmol), Raney-Ni (660 mg, 20 mol %) and methanol (200 mL) into the reaction kettle. At 40° C. with hydrogen (10 atm), the reaction taken for 24 hours. The reaction product was filtered and concentrated to obtain the product (2-benzamido-1-phenethyl)dimethylphosphonate (yield 95%). The analytical data of the product are as follows: $^1$H NMR (400 MHz, CDCl$_3$): δ 7.72 (t, J=5.6 Hz, 1H), 7.70-7.65 (m, 2H), 7.40-7.31 (m, 3H), 7.27 (t, J=7.4 Hz, 4H), 7.24-7.20 (m, 1H), 4.10-3.98 (m, 1H), 3.97-3.83 (m, 1H), 3.74-3.63 (m, 4H), 3.46 (d, J=10.6 Hz, 3H).

Example 27 Synthesis of 2-amino-1-phenethylphosphonic Acid (1) Taking (2-benzamido-1-phenethyl)dimethylphosphonate as the raw material, the reaction steps are as follows:
Adding (2-benzamido-1-phenethyl)dimethylphosphonate (1.33 g, 4 mmol) and 8 M hydrochloric acid (50 mL) into the reaction flask, and the mixture was refluxed;
(2) TLC followed the reaction to completion;
(3) The reaction solution was cooled to room temperature, washed with dichloromethane, concentrated, and recrystallized to obtain 2-amino-1-phenethylphosphonic acid (yield 81%). The analytical data of the product are as follows: $^1$H NMR (400 MHz, D$_2$O): δ7.40-7.24 (m, 5H), 3.62-3.36 (m, 2H), 3.30-3.11 (m, 1H).

The invention claimed is:
1. A method for preparing a β-phosphonoenamine derivative which comprises the following steps: dissolving an enamine derivative, an organic phosphine compound, manganese acetate, and potassium carbonate in a solvent and reacting at room temperature to obtain the β-phosphonoenamine derivative;
wherein the enamine derivative has the following structure:

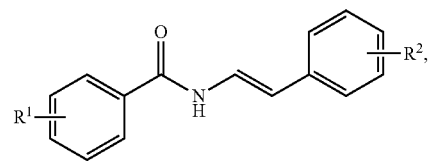

wherein R$^1$ and R$^2$ are one of the followings:
(1) R$^1$ is selected from the group consisting of hydrogen, methyl, methoxy, fluorine, chlorine, bromine, and trifluoromethyl, and R$^2$ is hydrogen; or
(2) R$^2$ is selected from the group consisting of methyl, methoxy, fluorine, chlorine, and bromine, and R$^1$ is hydrogen;

wherein the organic phosphine compound has the following structure:

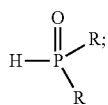

and wherein R is selected from the group consisting of methoxy, ethoxy, isopropoxy, tert-butoxy, and phenyl; wherein the β-phosphonoenamine derivative has the following structure:

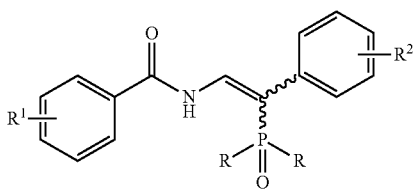

in which R1, R2 and R are as defined above.

2. The method for preparing the β-phosphonoenamine derivative according to claim 1, wherein the enamine derivative is selected from the group consisting of N-(styryl)benzamide, 2-chloro-N-(styryl)benzamide, 2-fluoro-N-(styryl)benzamide, 3-bromo-N-(styryl)benzamide, 4-bromo-N-(styryl)benzamide, 4-methyl-N-(styryl)benzamide, 4-methoxy-N-(styryl)benz-amide, 4-trifluoromethyl-N-(styryl)benzamide, 3,4,5-trimethoxy-N-(styryl)benzamide, N-(styryl)-thienylamide, N-(2-methylstyryl)benzamide, N-(2-methoxystyryl)benzamide, N-(2-fluorostyryl)benzamide, N-(2-chlorostyryl)benzamide, N-(3-methylstyryl)benzamide, N-(3-chlorostyryl)benzamide, N-(4-methylstyryl)benzamide, N-(4-fluorostyryl)benzamide, N-(4-chlorostyryl)-benzamide, and N-(4-bromostyryl)-benzamide.

3. The method for preparing the β-phosphonoenamine derivative according to claim 1, wherein the organic phosphine compound is selected from the group consisting of dimethyl phosphite, diethyl phosphite, diisopropyl phosphite, and diphenylphosphine oxide; the solvent is selected from the group consisting of methanol, ethanol, acetonitrile, acetone, and acetic acid.

4. The method for preparing the β-phosphonoenamine derivative according to claim 1, wherein the reaction is tracked to completion by a thin layer chromatography.

5. The method for preparing the β-phosphonoenamine derivative according to claim 1, wherein a molar ratio of the enamine derivative, the organic phosphine compound, manganese acetate, and potassium carbonate is 1:2:2.5:2.

6. The β-phosphonoenamine derivative prepared by the method according to claim 1, wherein the β-phosphonoenamine derivative has the following structure wherein $R^1$ and $R^2$ are one of the followings:

(1) $R^1$ is selected from the group consisting of hydrogen, methyl, methoxy, fluorine, chlorine, bromine, and trifluoromethyl, and $R^2$ is hydrogen; or (2) $R^2$ is selected from the group consisting of methyl, methoxy, fluorine, chlorine, and bromine, and $R^1$ is hydrogen;

and R is selected from the group consisting of methoxy, ethoxy, isopropoxy and tert-butoxy.

* * * * *